United States Patent [19]

Moon et al.

[11] Patent Number: 4,878,559
[45] Date of Patent: Nov. 7, 1989

[54] BRAKE SYSTEM FOR FOUR-WHEEL DRIVE VEHICLES

[75] Inventors: Seaton Moon; Mark A. Bergene, both of Cedar Falls, Iowa

[73] Assignee: Deere & Company, Moline, Ill.

[21] Appl. No.: 257,574

[22] Filed: Oct. 14, 1988

Related U.S. Application Data

[63] Continuation-in-part of Ser. No. 155,772, Feb. 16, 1988, Pat. No. 4,811,811.

[51] Int. Cl.⁴ ............................................. B60K 23/08
[52] U.S. Cl. .................................... 180/244; 180/247
[58] Field of Search ....................... 180/233, 244, 247; 192/4 R, 4 A, 13 R, 13 A

[56] References Cited

U.S. PATENT DOCUMENTS

| | | | |
|---|---|---|---|
| 3,081,836 | 3/1963 | Hill | 180/244 |
| 3,665,018 | 4/1982 | Higuchi et al. | 192/4 A |
| 3,963,085 | 6/1976 | Vinton | 180/247 |
| 4,088,208 | 5/1978 | Goode | 192/4 A |
| 4,456,108 | 6/1984 | Kageyama | 192/4 A |
| 4,466,519 | 8/1984 | Romer | 192/13 A |
| 4,589,511 | 5/1986 | Leiber | 180/244 |
| 4,711,317 | 12/1987 | Sakakiyama | 180/247 |
| 4,711,318 | 12/1987 | Kitade | 280/247 |
| 4,746,173 | 5/1988 | Fenmaz et al. | 180/244 |

Primary Examiner—Kenneth R. Rice

[57] ABSTRACT

A clutch control system for the front wheel drive clutch of a four-wheel drive vehicle engages the front wheel drive clutch when both service brakes are simultaneously released or simultaneously applied, but disengages the clutch when only the left or the right service brake alone is applied. The control system includes three brake-operated switches, a manually-operated switch and a speed responsive switch connected to the solenoid of a front wheel drive clutch control valve.

13 Claims, 4 Drawing Sheets

BRAKE SYSTEM FOR FOUR-WHEEL DRIVE VEHICLES

BACKGROUND OF THE INVENTION

This application is a continuation-in-part of Ser. No. 155,772, filed 16 Feb. 1988, now U.S. Pat. No. 4,811,811 which in incorporated herein by reference.

This invention relates to a drive and brake system for a vehicle having a constantly driven rear axle and a front axle controllably driven via an engageable and disengageable front wheel drive clutch.

In one commercially available tractor, it is known to provide a control system which automatically engages its 4-wheel drive when braking and which automatically disengages the 4-wheel drive when the tractor ground speed is greater than 9 miles per hour. However, this known control system does not automatically disengages the 4-wheel drive when only one of the left and right brakes is applied. This is undesirable because when operating an agricultural tractor, it is often advantageous to use only one of the left or right foot brakes to assist in steering the tractor through a headland turnaround. Having the 4-wheel drive engaged during such a brake-assisted steering operation interferes with such turning in that more brake effort is required and front tire pushing, skidding and wear is increased.

From published German patent No. DE 2,946,477, it is known to engage a front-wheel drive clutch which transmits power to a front axle when service brakes for the rear axle are applied. Thus, in this system, it appears that the front wheel drive can interfere with brake-assisted steering because there is no suggestion that the front wheel drive is not engaged when only the left or the right wheel brake is applied. In one embodiment described in No. DE 2,946,477, a solenoid-operated valve controls a pressure-operated front wheel drive clutch and the solenoid energization is controlled by a brake-responsive switch. However, the system of No. DE 2,946,477 requires a distributor valve hydraulically coupled to left and right brake cylinders and a piston hydraulically connected to the distributor valve and mechanically connected to the brake-responsive switch. Thus, such a system requires expensive hydraulic components which rob hydraulic fluid that might be needed for emergency braking.

SUMMARY OF THE INVENTION

An object of the present invention is to provide a control system which automatically disengages a tractor front wheel drive when only one of the left or right rear wheel brake is applied, but wherein the front wheel drive is engaged when both left and right service brakes are applied.

This and other objects are achieved by the present invention which includes three brake-operated switches which are connected to left and right service brake pedals so that depressing a brake pedal to apply a service brake operates one or two of the switches. A manually operated switch is mounted on the console of the vehicle operator's compartment. A speed responsive switch is operated by a relay connected to a vehicle speed sensor. These switches are connected between a battery and the solenoid of a clutch control valve. The clutch control valve controls the fluid pressure in a spring-engaged, pressure-released front wheel drive clutch between the vehicle transmission and the front axle. The system operates to engage the clutch when both service brakes are simultaneously applied, but operates to disengage the clutch when only one of the left and right service brakes are applied and to disengage the clutch when vehicle speed exceeds a limit speed.

DETAILED DESCRIPTION

Figure 1:
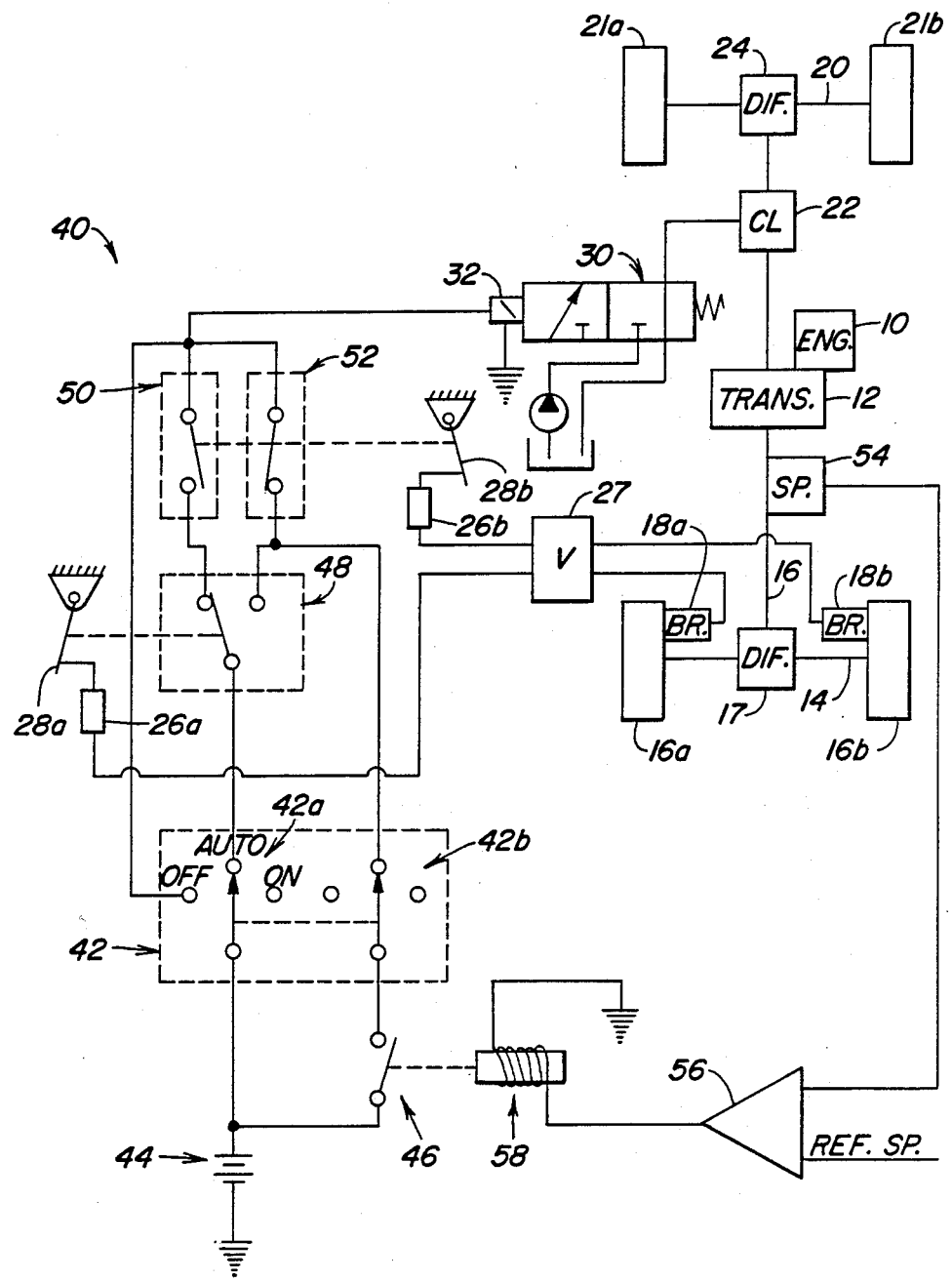
FIG. 1 is a schematic diagram of a front wheel drive clutch control system constructed according to the present invention.

A vehicle, such as a tractor, includes an engine 10 which drives a transmission 12. The transmission drives a rear axle 14 via shaft 16 and differential 17. The rear axle 14 supports a pair of rear driving wheels 16a, 16b, each with a corresponding service brake 18a, 18b. The engine also drives a front axle 20 and front wheels 21a, 21b via a pressure-operated clutch 22 and differential 24. The service brakes 18a, 18b are fluid-operated by conventional master cylinders 26a, 26b, each connected to a corresponding brake pedal 28a, 28b via a conventional brake equalization valve 27.

The clutch 22 is preferably a known spring-engaged, pressure-released clutch such as described in No. DE 2,946,477. The pressure in clutch 22 is controlled by a valve 30 which is actuated by a solenoid 32.

A control circuit 40 controls energization of the solenoid 32. Circuit 40 includes a double pole, 3-position operator controlled switch 42 which preferably is mounted in the vehicle cab (not shown). Pole 42a has a first terminal connected to potential source 44, such as a vehicle battery, and second, third and fourth terminals. Pole 42b has a first terminal connected to battery 44 via relay switch 46 and second, third and fourth terminals.

Circuit 40 includes a brake-operated switch 48 with a first terminal connected to the second terminal of pole 42a, second and third terminals and a switch element operatively connected to left brake pedal 28a so that when pedal 28a is released, the first terminal is connected to the second terminal and when pedal 28a is depressed, the first terminal is connected to the third terminal.

A normally open brake operated switch 50 has a first terminal connected to the second terminal of the brake-operated switch 48, a second terminal connected to the solenoid 32 and a switch element operatively connected to the right brake pedal 28b so that switch 50 is open when pedal 28b is released and closed when pedal 28b is depressed.

A normally closed brake operated switch 52 includes a first terminal connected to the third terminal of switch 48 and to the second terminal of pole 42b, a second terminal connected to solenoid 32 and a switch element operatively connected to right brake pedal 28b so that switch 52 is closed when pedal 28b is released and open when pedal 28b is depressed.

A speed sensor 54 senses the speed of the vehicle and provides a signal representative thereof to comparison circuit 56. Comparison circuit 56 may include a conventional comparator and amplifier connected so as to energize coil 58 and close relay switch 46 only when the vehicle speed exceeds a predetermined speed.

When the switch 42 is in the "AUTO" position, as indicated in the figure, the circuit 40 operates to engage the clutch 22 when both brake pedals are depressed and to disengage the clutch 22 when either one or the other, but not both of pedals 28a, 28b are depressed. When both pedals 28a, 28b are released, the clutch 22 will be engaged, except when the vehicle speed exceeds a certain speed of, for example 9 mph, then relay switch 46 closes, thus energizing solenoid 32 and dis-engaging clutch 22.

When switch 42 is in the "OFF" position, the solenoid 32 is energized and the clutch is disengaged. When switch 42 is in the "ON" position, the solenoid 32 is de-energized and the clutch 22 is engaged. In both the "OFF" and "ON" positions, the solenoid 32 is uneffected by brake operation or by vehicle speed.

Figure 2:
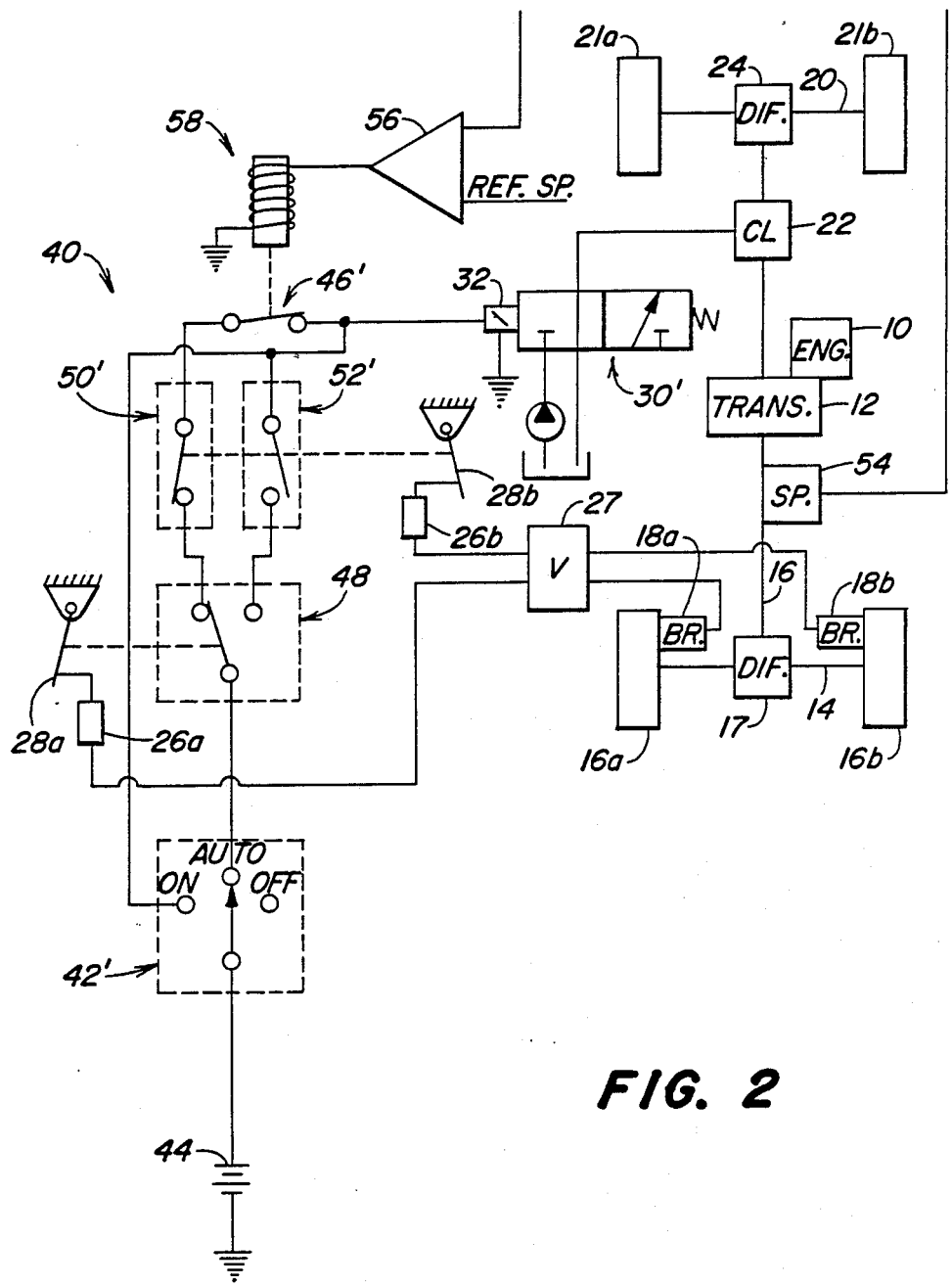
FIGS. 2-4 are schematic diagrams of alternate embodiments of the present invention.

An alternate embodiment is shown in FIG. 2 wherein switches 50 and 52 are replaced by normally closed switch 50' and normally open switch 52', respectively. Switch 42b is eliminated and switch 42' includes an "ON" terminal connected to the solenoid 32 and to the second terminal of switch 52'. The second terminal of switch 50' is coupled to solenoid 32 and to the second terminal of switch 52' by way of a normally closed solenoid operated switch 46' which is opened by solenoid 58 and comparator 56 when vehicle speed exceeds the predetermined speed. The valve 30' is shown in position to connect clutch 22 to sump (clutch 22 engaged) when solenoid 32 is energized. In other respects, FIG. 2 is similar to FIG. 1 with similar parts identified with the same reference numerals. With the circuit shown in FIG. 2, the clutch 22 will be engaged only when the solenoid 32 is energized.

Figure 3:
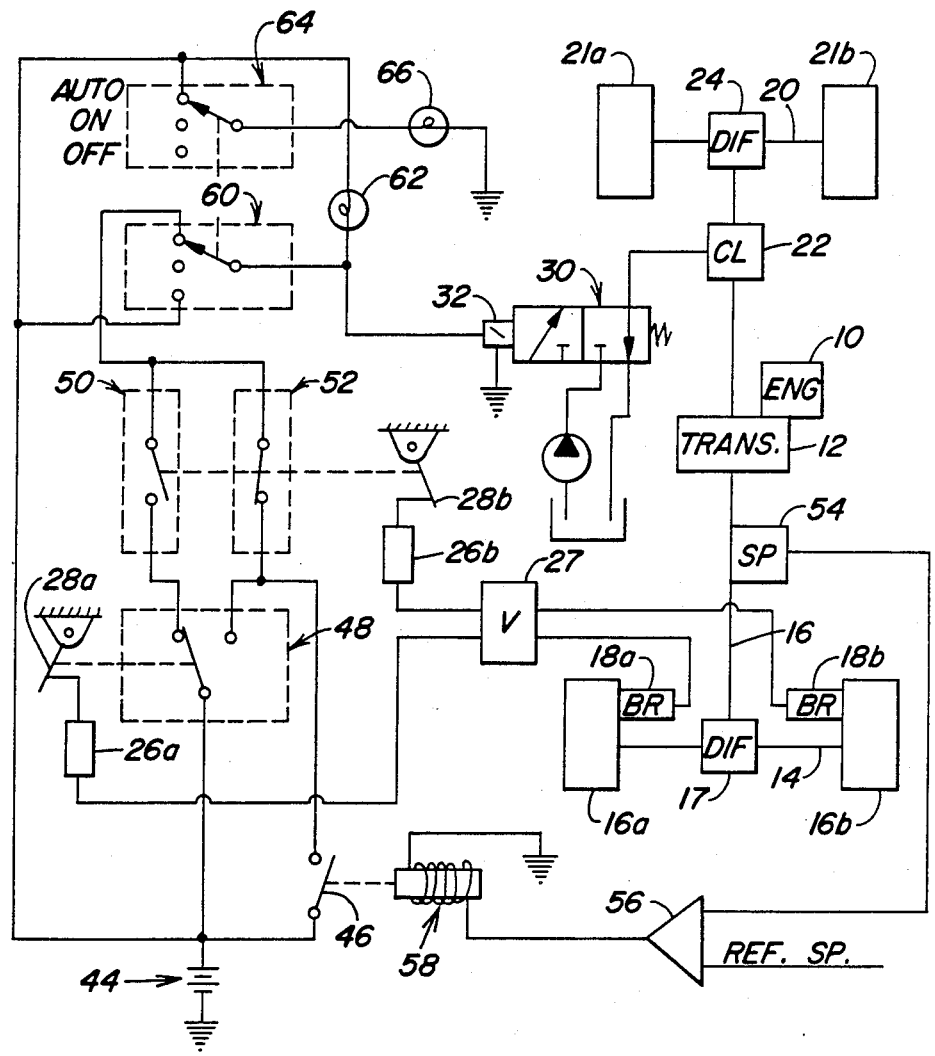

Another alternate embodiment of the present invention is shown in FIG. 3. This alternate embodiment is similar to that which is shown in FIG. 1, but differs in the following respects. In FIG. 3, the relay switch 46 is connected directly to the first terminal of switch 52 and the battery 44 is connected directly to the first terminal of switch 48. In FIG. 3, a first operator controlled switch 60 includes a first terminal connected to the solenoid 32 and to one side of indicator lamp 62, a second terminal connected to the second terminals of switches 50 and 52, a third unconnected terminal, a fourth terminal connected to battery 44, and an operator-controlled switch element movable to connect the first terminal of switch 60 with any one of its second, third or fourth terminals.

The FIG. 3 circuit also includes a second operator controlled switch 64 which has a first terminal connected to ground via indicator lamp 66, a second terminal connected to battery 44 and to the other side of indicator lamp 62, unconnected third and fourth terminals, and an operator-controlled switch element which is movable to connect the first terminal of switch 64 with any one of its second, third or fourth terminals. Preferably, the switch elements of switches 60 and 64 are ganged together as shown in FIG. 3. Lamps 62 and 64 are preferably located in the vehicle cab (not shown) so as to provide the operator with an indication of the engagement and disengagement of clutch 22 and of when switches 60 and 64 are in the "AUTO" position.

The circuit of FIG. 3 operates the same as the circuit of FIG. 1, except that indicator lamp 62 turns on whenever the clutch 22 is engaged and turns off whenever the clutch 22 is disengaged, and indicator lamp 66 lights up only when switches 60 and 62 are in the "AUTO" position with their first and second terminals interconnected.

Figure 4:
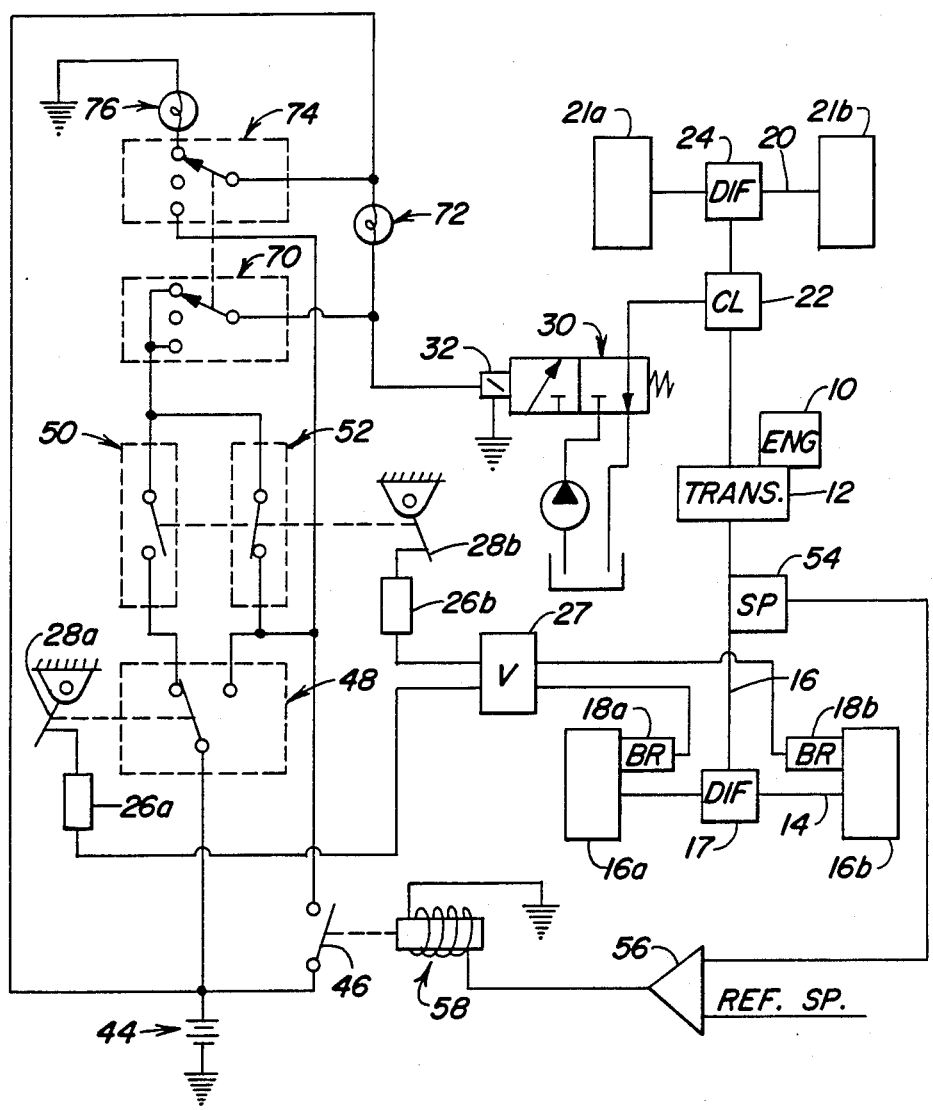

Another alternative embodiment is shown in FIG. 4. This embodiment is similar to the embodiment of FIG. 3, except that the FIG. 4 embodiment includes a first operator-controlled switch 70 with a first terminal connected to the solenoid 32 and to one side of the indicator lamp 72, a second and fourth terminal connected together and to the second terminals of switches 50 and 52, a third unconnected terminal and a switch element movable to connect the first terminal with any one of the second, third or fourth terminals.

A second operator-controlled switch 74 includes a first terminal connected to the other side of lamp 72 and to battery 44, a second terminal connected to ground via indicator lamp 76, an unconnected third terminal, a fourth terminal connected to the common connection between switches 46, 48 and 52 and a switch element ganged with the switch element of switch 70 and movable to connect its first terminal with any one of its second, third or fourth terminals.

The circuit of FIG. 4 operates similar to the circuit of FIG. 3, except that when switches 70 and 74 are in the "OFF" position, the clutch 22 will be engaged only when both brake pedals are applied. The possibility of 4-wheel braking even when the switches 70 and 74 are in the "OFF" position could be desirable in locations such as Europe where higher transport speeds are permitted.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a vehicle having a primary axle driven by an engine via a transmission, first and second drive wheels on the primary axle, first and second service brakes for braking the respective first and second drive wheels, a secondary axle supporting a pair of secondary wheels, a clutch between the engine and the secondary axle, a clutch control means for controlling engagement and disengagement of the clutch, and a mode controller;

the clutch control means comprising:
means for automatically engaging the clutch when both service brakes are applied;
means for engaging the clutch when both service brakes are released; and
means for automatically disengaging the clutch when only one of the first and second service brakes is applied, the clutch control means being operable as a function of a potential applied to an input thereof;
the means for automatically engaging and disengaging comprises a control circuit comprising:
a potential source;
a second potential source;
first switch having a first terminal for connecting to the potential source, a second terminal, a third terminal and a switch element operatively connected to the first service brake to close a circuit between the first and second terminals when the first service brake is released and to close a circuit between the first and third terminals when the first service brake is applied;

a second switch having a first terminal connected to one of the second and third terminals of the first switch, a second terminal connected to the clutch control means and a switch element operatively connected to the second service brake to close a circuit between its terminals when the second service brake is released and to open a circuit between its terminals when the second service brake is applied; and a third switch having a first terminal connected to the other of the second and third terminals of the first switch, a second terminal connected to the clutch control means and a switch element operatively connected to the second service brake to open a circuit between its terminals when the second service brake is released and to close a circuit between its terminals when the second service brake is applied;

the mode controller being coupled to the clutch control means, the potential source and to at least one of the first, second and third switches, the mode controller having a first state wherein the clutch control means is controlled as a function of the operation of the service brakes, the mode controller also having a second state wherein the clutch control means causes engagement of the clutch regardless of the operation of the service brakes.

2. The invention of claim 1, further comprising mode indicator means for generating an operator-detectable signal representing the state of the mode controller.

3. The invention of claim 2, wherein: the mode indicator means generates a signal only when the mode controller is in its first state.

4. The invention of claim 2, further comprising: clutch indicator means for generating operator detectable signals representing the engagement and disengagement condition of the clutch.

5. The invention of claim 1, wherein: the mode controller has a third state wherein it causes the clutch control means to disengage the clutch regardless of the operation of the service brakes.

6. The invention of claim 1, wherein: the mode controller has a third state wherein it causes the clutch control means to engage the clutch only when both service brakes are applied simultaneously.

7. In a vehicle having a primary axle driven by an engine via a transmission, first and second drive wheels on the primary axle, first and second service brakes for braking the respective first and second drive wheels, a secondary axle supporting a pair of secondard wheels, a clutch between the engine and the secondary axle, a clutch control means for controlling engagement and disengagement of the clutch, the clutch control means comprising:

means for automatically engaging the clutch when both service brakes are applied;

means for engaging the clutch when both service brakes are released;

means for automatically disengaging the clutch when only one of the first and second service brakes is applied;

the clutch control means being operable as a function of a potential applied to an input thereof; and the means for automatically engaging and disengaging comprises a control circuit comprising:

a first potential source;

first switch having a first terminal for connecting to the first potential source, a second terminal, a third terminal and a switch element operatively connected to the first service brake to close a circuit between the first and second terminals when the first service brake is released and to close a circuit between the first and third terminals when the first service brake is applied;

a second switch having a first terminal connected to one of the second and third terminals of the first switch, a second terminal connected to the clutch control means and a switch element operatively connected to the second service brake to close a circuit between its terminals when the second service brake is released and to open a circuit between its terminal when the second service brake is applied; and a third switch having a first terminal connected to the other of the second and third terminals of the first switch, a second terminal connected to the clutch control means and a switch element operatively connected to the second service brake to open a circuit between its terminals when the second service brake is released and to close a circuit between its terminals when the second service brake is applied;

the clutch control means further comprising;

an operator-controlled switch having a first terminal connected to the clutch control means, a second terminal connected to the second terminals of the second and third switches, a third terminal, a fourth terminal connected to the first potential source, and a switch element movable to a first position interconnecting the first and second terminals, to a second position interconnecting the first and third terminals, and to a third position interconnecting the first and third terminals.

8. The invention of claim 7, further comprising: an indicator device connected between the first potential source and the first terminal of the operator-controlled switch.

9. The invention of claim 7, further comprising:
a second potential source; and
a further operator-controlled switch having:
a first terminal connected to the second potential source:
a second terminal connected to the first potential source:
at least one further terminal; and
a switch element movable to a first position interconnecting the first and second terminals and to a further position interconnecting the first terminal with the at least one further terminal.

10. The invention of claim 9, further comprising: a first electrical indicator device connected between the first potential source and the first terminal of the operator-controlled switch.

11. The invention of claim 10, further comprising: a second electrical indicator device connected between the second potential source and the first terminal of the further operator-controlled switch.

12. In a vehicle having a primary axle driven by an engine via a transmission, first and second drive wheels on the primary axle, first and second service brakes for braking the respective first and second drive wheels, a secondary axle supporting a pair of secondary wheels, a clutch between the engine and the secondary axle, a clutch control means for controlling engagement and disengagement of the clutch, the clutch control means comprising:

means for automatically engaging the clutch when both service brakes are applied;
means for engaging the clutch when both service brakes are released;
means for automatically disengaging the clutch when only one of the first and second service brakes is applied,
the clutch control means being operable as a function of a potential applied to an input thereof; and
the means for automatically engaging and disengaging comprises a control circuit comprising:
a first potential source;
first switch having a first terminal for connecting to the first potential source, a second terminal, a third terminal and a switch element operatively connected to the first service brake to close a circuit between the first and second terminals when the first service brake is released and to close a circuit between the first and third terminals when the first service brake is applied;
a second switch having a first terminal connected to one of the second and third terminals of the first switch, a second terminal connected to the clutch control means and a switch element operatively connected to the second service brake to close a circuit between its terminals when the second service brake is released and to open a circuit between its terminals when the second service brake is applied; and
a third switch having a first terminal connected to the other of the second and third terminals of the first switch, a second terminal connected to the second service brake to open a circuit between its terminals when the second service brake is released and to close a circuit between its terminals when the second service brake is applied;
the clutch control means further comprising:
an operator-controlled switch comprising a first terminal connected to the clutch control means, a second terminal connected to the second terminals of the second and third switches, a third terminal, a fourth terminal connected to the second terminals of the second and third switches, and a switch element movable to first, second and third positions interconnecting the first terminal with the second, third and fourth terminals, respectively.

13. The invention of claim 12, further comprising:
a second potential source; and
a further operator-controlled switch comprising:
a first terminal connected to the first potential source;
a second terminal connected to the second potential source via a first electrical indicator device;
a third terminal;
a fourth terminal connected to the third terminal of the first switch;
a switch element movable to first, second and third positions interconnecting its first terminal with the second, third and fourth terminals, respectively; and
a second electrical indicator device connected between the clutch control means and the first potential source.

* * * * *

UNITED STATES PATENT AND TRADEMARK OFFICE
CERTIFICATE OF CORRECTION

PATENT NO. : 4,878,559

DATED : 7 November 1989

INVENTOR(S) : Seaton Moon and Mark A. Bergene

It is certified that error appears in the above-identified patent and that said Letters Patent is hereby corrected as shown below:

In Column 4, line 59, delete "a second potential source;"

Signed and Sealed this

Eighteenth Day of June, 1991

Attest:

HARRY F. MANBECK, JR.

Attesting Officer

Commissioner of Patents and Trademarks